United States Patent
Stoler et al.

(10) Patent No.: US 10,185,678 B1
(45) Date of Patent: Jan. 22, 2019

(54) UNIVERSAL OFFLOADING ENGINE

(71) Applicant: Amazon Technologies, Inc., Seattle, WA (US)

(72) Inventors: Gil Stoler, Nofit (IL); Erez Izenberg, Tel-Aviv (IL)

(73) Assignee: Amazon Technologies, Inc., Seattle, WA (US)

( * ) Notice: Subject to any disclaimer, the term of this patent is extended or adjusted under 35 U.S.C. 154(b) by 201 days.

(21) Appl. No.: 14/954,682

(22) Filed: Nov. 30, 2015

Related U.S. Application Data

(60) Provisional application No. 62/249,015, filed on Oct. 30, 2015.

(51) Int. Cl.
*G06F 13/28* (2006.01)
*G06F 13/40* (2006.01)
*G06F 13/42* (2006.01)

(52) U.S. Cl.
CPC .......... *G06F 13/28* (2013.01); *G06F 13/4022* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 7,502,884 B1* | 3/2009 | Shah | H04L 67/1097 370/395.21 |
| 8,775,824 B2* | 7/2014 | Kershaw | G06F 21/53 713/164 |
| 2007/0073915 A1* | 3/2007 | Go | G06F 13/28 710/11 |
| 2007/0073922 A1* | 3/2007 | Go | G06F 13/28 710/22 |
| 2008/0267066 A1* | 10/2008 | Archer | G06F 13/28 370/235 |
| 2009/0006546 A1* | 1/2009 | Blumrich | G06F 15/16 709/204 |
| 2015/0046675 A1* | 2/2015 | Barry | G06F 13/28 712/7 |
| 2016/0283415 A1* | 9/2016 | McBride | G06F 13/1642 |

* cited by examiner

*Primary Examiner* — Henry Tsai
*Assistant Examiner* — Aurangzeb Hassan
(74) *Attorney, Agent, or Firm* — Kilpatrick Townsend & Stockton LLP

(57) ABSTRACT

Methods and apparatuses for offloading functionality in an integrated circuit are presented. Certain embodiments are described that disclose methods pertaining to implementation of a universal offload engine that can service several functional blocks, each configured to perform a different function. The offload engine can be iteratively implemented with a common interface to functional blocks. Work descriptors can be used between DMA engines and corresponding functional blocks to instruct the DMA engines how to transport data between memory locations and/or to reformat the data.

24 Claims, 10 Drawing Sheets

UNIVERSAL OFFLOADING ENGINE

CROSS-REFERENCE TO OTHER APPLICATION

The present application is a non-provisional patent application of U.S. Provisional Application No. 62/249,015, entitled "UNIVERSAL OFFLOADING ENGINE," filed on Oct. 30, 2015, which is incorporated herein by reference in its entirety

BACKGROUND

Integrated circuits, including Systems on Chips (SOCs) are becoming increasingly complex and can include a variety of functional blocks. These functional blocks can serve a variety of differing functions and are becoming increasingly more specialized. One common feature of several functional blocks can be the inclusion of an offloading engine, such as a Dynamic Memory Access (DMA) engine, that can serve to independently retrieve or transmit data to or from various memory locations with minimal oversight from the associated functional block, freeing the associated functional block from these tasks.

BRIEF DESCRIPTION OF THE DRAWINGS

Various embodiments in accordance with the present disclosure will be described with reference to the drawings, in which.

DETAILED DESCRIPTION

Figure 1:
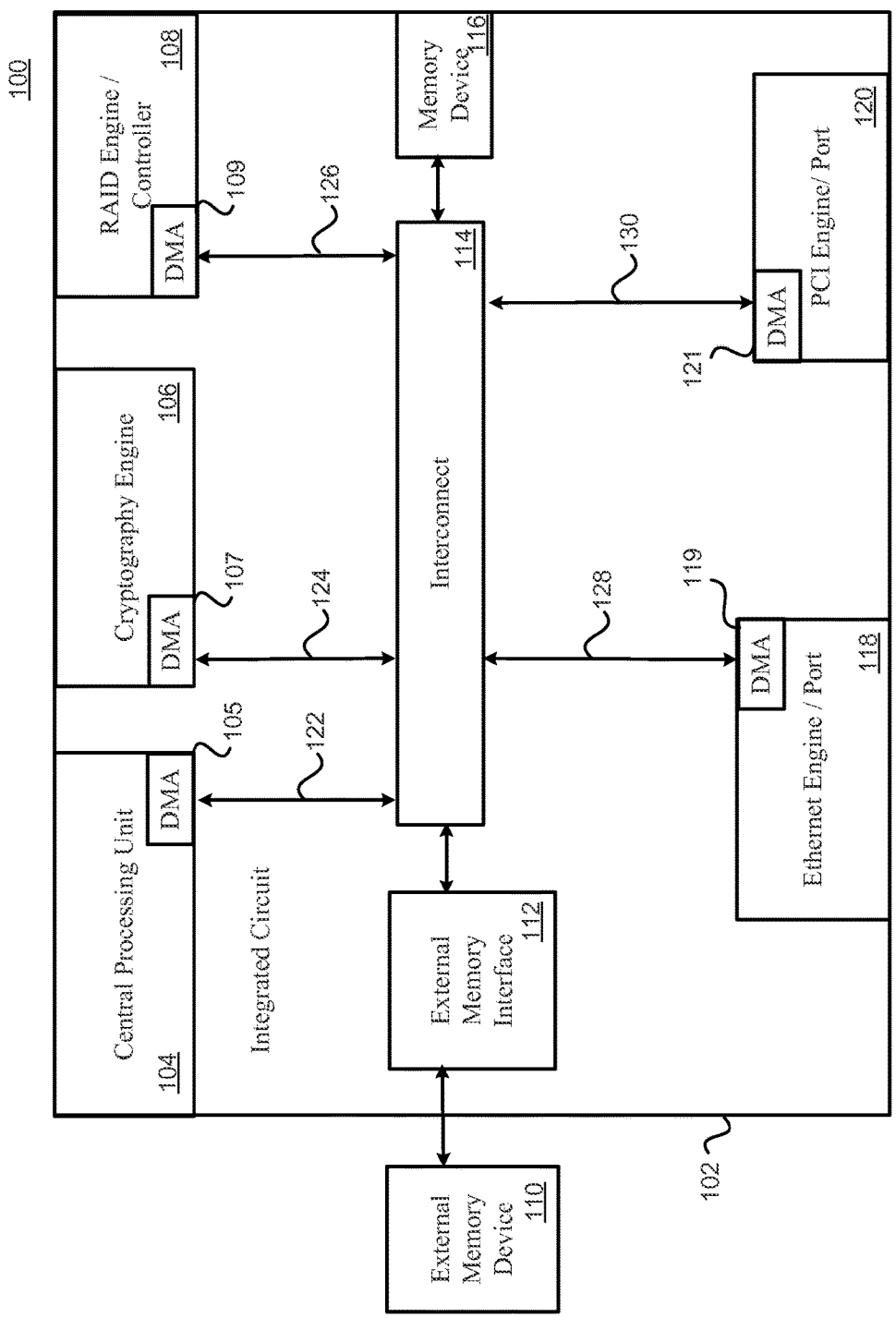
FIG. 1 illustrates an integrated circuit comprising various functional blocks with respective DMA engines that can embody various features of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Dynamic Memory Access (DMA) engines serve to independently retrieve or transmit data to or from various memory locations with low or minimal oversight from an associated functional block, freeing the associated functional block from these tasks. This functionality can improve the efficiency of the associated functional block by reducing overhead associated with memory transfers. DMA engines (sometimes referred to herein as "DMA functional blocks") can be tailored to provide specific functionality to each corresponding functional block. As such, the interface between each DMA engine and corresponding functional block can be proprietary. Additionally, the functionality of a specific DMA engine can be tailored for the needs of a corresponding functional block in order to optimize die space associated with the DMA engine and to improve data transfer rates of the DMA engine. However, this unique design methodology can lead to a variety of differing DMA engine architectures when integrating several functional blocks into an integrated circuit, increasing development costs and times and reducing the ability of an integrator to troubleshoot issues pertaining to DMA engines. Thus, there is need for improvement in the field of integrated circuits.

Disclosed are methods and apparatuses pertaining to a universal offload engine for transferring data between two memory locations in a computing system. The universal offload engine can take the form of a DMA engine. A DMA engine can be configured as a coprocessor that can receive instructions to transfer data between two memory locations. When a memory transfer is completed, the DMA engine can then signal the completion to a coupled processor (or other logic device), unburdening the processor from many memory transfer tasks. This disclosure include features enabling a single design of a universal DMA engine to be used iteratively in conjunction with many different types of functional blocks (e.g., Central Processing Units (CPU), cryptography engines, Graphics Processing Unit (GPU), RAID (Redundant Array of Inexpensive Devices) controllers, ethernet engines, etc.).

The functionality of the universal offload engine can be enabled through the use of a defined, common interface and/or protocol that each functional block can conform to when communicating with the universal offload engine. This common interface can include standardized descriptors allowing memory transferred by the universal offload engine to be handled in a variety of different manners to account for different memory structures and functionalities of functional blocks. The functionality of the universal offload engine and the common interface can be configured to enable high speed data transfer rates required by various functional blocks (and possibly using various data formats) in order to meet data transfer rate requirements of the various functional blocks. The use of the universal offload engine enables a single hardware design to be used iteratively within an integrated circuit with multiple different types of functional blocks. This commonality can reduce development and testing times associated with offload engines and enable the use of common debugging tools between an offload engine and an associated functional block of an integrated circuit.

FIG. 1 illustrates a notional integrated circuit 102 comprising several functional blocks coupled via an SoC interconnect fabric 114 to a memory device 116 and an external memory interface 112. External memory interface 112 is illustrated as being coupled to an external memory device 110. External memory device 110 can be primary system memory comprising Random Access Memory (RAM) or a storage device. The external memory device 110 can comprise DDR (Double Data Rate) RAM, DRAM (Dynamic RAM), SRAM, or other memory designs/types. External memory device 110 can comprise a mechanical/magnetic hard drive, a Solid State Drive (SSD), or other form of storage medium. External memory interface 112 can include a SATA (Serial Advanced Technology Attachment), PATA (Parallel Advanced Technology Attachment), Universal Serial Bus (USB), a SPI (Serial Peripheral Interface), I2C (Inter-Integrated Circuit), CAN (Controller area network), PCIe (Peripheral Component Interconnect Express), USB (Universal Serial Bus), or other memory interface protocols/technologies and/or controller(s). Internal memory device 116 can include similar memory technologies/interfaces and can be used as either primary memory (e.g., RAM) or secondary memory (i.e., storage memory).

FIG. 1 also illustrates several functional blocks including a CPU 104. CPU 104 may include a single or multi-core processor. A multi-core CPU may include multiple processing units within the same CPU. CPU 104 may be configured to execute a plurality of instructions collectively on one or more processors of CPU 104. The instructions may be stored on a computer-readable storage medium, for example, in the form of a computer program. The computer-readable storage medium (e.g., external memory device 110) may be non-transitory. In some implementations, the multi-core processors may share certain resources, such as busses and cache hierarchies (e.g., Level 1 (L1) cache, Level 2 (L2) cache and Level 3 (L3) cache) between multiple-cores. In some instances, each core in a single or multi-core processor may also include multiple executing logical processors (or threads). Some of the non-limiting examples of the multi-core processors may include ARM®'s cortex A57, MIPS, AMD®'s A4, Intel®'s ATOM®, etc. The processor can likewise utilize an x86, ARMS, MIPS, or other suitable instruction set.

Functional Block 106 is illustrated as a cryptographic engine 106. Cryptographic engine 106 can be configured to implement various cryptographic functions. For example, the cryptographic engine can be configured to implement Advaned Encryption Standard (AES), Triple Data Encryption Stanard (DES), RSA, Blowfish, Twofish, or other encryption algorithms. Cryptographic engine 106 can be configured to receive instructions to unencrypt or, alternatively, to encrypt data stored in memory, such as memory device 116 or external memory device 110.

Functional block 108 is illustrated as being a RAID engine/controller 108. RAID engine 108 can be used to format and/or transfer data to be stored across several different memory devices in a striped, striped, mirrored, parity, or a combination thereof. Using RAID engine 108, data can be moved to or from multiple memory devices (such as memory device 116 or external memory device 110) by allocating portions of data across several drives. For example, data can be portioned into words and bytes or bits of each word can be spread across multiple drives. Using RAID techniques, the performance associated with accessing stored data and/or the redundancy of stored data can be improved.

Functional block 118 can be an ethernet engine and/or port 118. Ethernet engine 118 can be configured to encapsulate or de-encapsulate data stored in memory (such as memory device 116, external memory device 110, and/or in internal memory space of the ethernet engine 118) to conform to internet protocol standards. Ethernet engine 118 can read data from a memory location, encapsulate or de-encapsulate the data, and then move the data to the same or a different memory location. Alternatively or additionally, ethernet engine 119 can move encapsulated data directly to an ethernet port or retrieve data from the ethernet port.

Functional block 120 can be a Peripheral Component Interconnect (PCI) engine and/or port 120. PCI engine 120 can have similar functionality as to the ethernet engine/port 118, but instead adhering to ethernet protocol standards, PCI engine 120 can conform to PCI or PCIe protocols/interfaces.

Functional blocks 104, 106, 108, 118, and 120 can all have internal memory, buffers, registers, or other memory devices to temporarily store data for processing or forwarding therein. For example, ethernet engine 118 can contain internal buffers for storing encapsulated data that is received over an ethernet port prior to being de-encapsulated and/or stored in another memory location. CPU 104 can have various caches and registers of various configuration, as disclosed herein, to temporarily store data to be processed or as a result of processing therein, for example.

Each of functional blocks 104, 106, 108, 118, and 120 can comprise a corresponding offloading DMA engine 105, 107, 109, 119, and/or 121. DMA engines 105, 107, 109, 119, and/or 121 can be designed to service and integrate into a specific functional block and can be used to provide functionality for transferring data between two memory locations without all-inclusive oversight by a processor. For example, CPU 104 can direct DMA engine 105 to move data from memory location X to memory location Y, wherein memory locations X and Y can be different memory locations internal or external to integrated circuit 102.

Each of functional blocks 104, 106, 108, 118, and 120 and/or DMA engines 105, 107, 109, 119, and 121 can cross communicate using Interconnect fabric 114 via interfaces 122, 124, 126, 128, and 130. For example, interfaces 122, 124, 126, 128, and 130 can be an Advanced Extensible Interface (AXI) interface. Interconnect fabric 114 can include a controller that can be configured to arbitrate and/or route data transfers through interconnect fabric 114. For example, data transmissions from CPU 104 and/or cryptography engine 106 may be prioritized such that some data transmissions are transferred before others. Some data transfers can interrupt other data transfers. Data transfers can occur between functional blocks or between functional blocks and memory devices.

Prior to the use of DMA engines, CPUs may have implemented several tasks to initiate and complete a data transfer. These tasks may have included populating a buffer with data to be transferred, periodically ensuring that the data from the buffer had been transferred, periodically repopulating the buffer with new data, and/or implementing various error and/or encryption schemas on the data. A DMA engine can relieve a CPU of this burden. Through the use of a DMA engine, a CPU can send a DMA engine specific information, such as a memory location of data to be transferred, a destination memory address, and/or the amount of data to be transferred. A DMA engine can then autonomously transfer the data between specified memory locations and signal the CPU when the transfer is complete (such as via an interrupt).

DMA engines can be tailored to work exclusively with a unique functional block. For example, DMA engine 105 can be designed to uniquely interface with CPU 104 and may not be able to function when coupled to cryptography engine 106. Likewise, DMA engine 107 may not be able to function when coupled to CPU 104. Each DMA engine can be configured to read data from specific registers or memory locations of an associated functional block. For example, DMA engine 105 may be configured via hardware to read a memory address location to transfer data to from a specific register of CPU 104. This specific register would likely be absent from other functional blocks, as likely would the specified interface to the register.

Functional blocks can be developed independently and then integrated within an integrated circuit using an interconnect fabric, such as interconnect fabric 114. This approach to integration can occur if the integrated circuit 102 is an SoC, for example. As such, multiple unique DMA engines can be integrated into a single integrated circuit, each requiring independent design, validation, and integration. The uniqueness of each DMA engine can increase the time to market and increase the cost of the integrated circuit through these labor efforts. Additionally, errors between each functional block and DMA engine can be difficult to troubleshoot as an integrator may not have access to or tools necessary to record transactions between a functional block and a corresponding DMA engine.

Each DMA engine 105, 107, 109, 119, and 121 can alternatively be implemented with common functionality (e.g., the same design for each engine) using features of the present disclosure. In this sense, each DMA engine can be used iteratively as the same functionality of DMA engine can be repeatedly used in the integration circuit 102. Using a single hardware and/or functional design of universal DMA engine between multiple functional blocks can decrease time to market of an integrated circuit by reducing development and testing costs and times. As an example, using a common or universal DMA engine can result in the labor costs associated with design and validation of the universal DMA engine to be shared across the cost to integrate functional blocks associated with the universal DMA engine. In other words, the more pervasive use of a universal DMA engine in an integrated circuit design can result in reduced costs associated with DMA engine implementation for the integrated circuit. A singular design of universal DMA engine can be designed and validated then be repeatedly synthesized within an integrated circuit. A universal DMA engine can become a functional block of an integrated circuit that communicates with one of functional blocks (for example, 104, 106, 108, 118, or 120), and can utilize a common and standardized interface and/or protocol for communication with functional blocks. Additionally, the use of a common interface can enable an integrator to develop a tool set to diagnose the interconnection between each DMA block and correspondingly coupled functional block(s).

Figure 2:
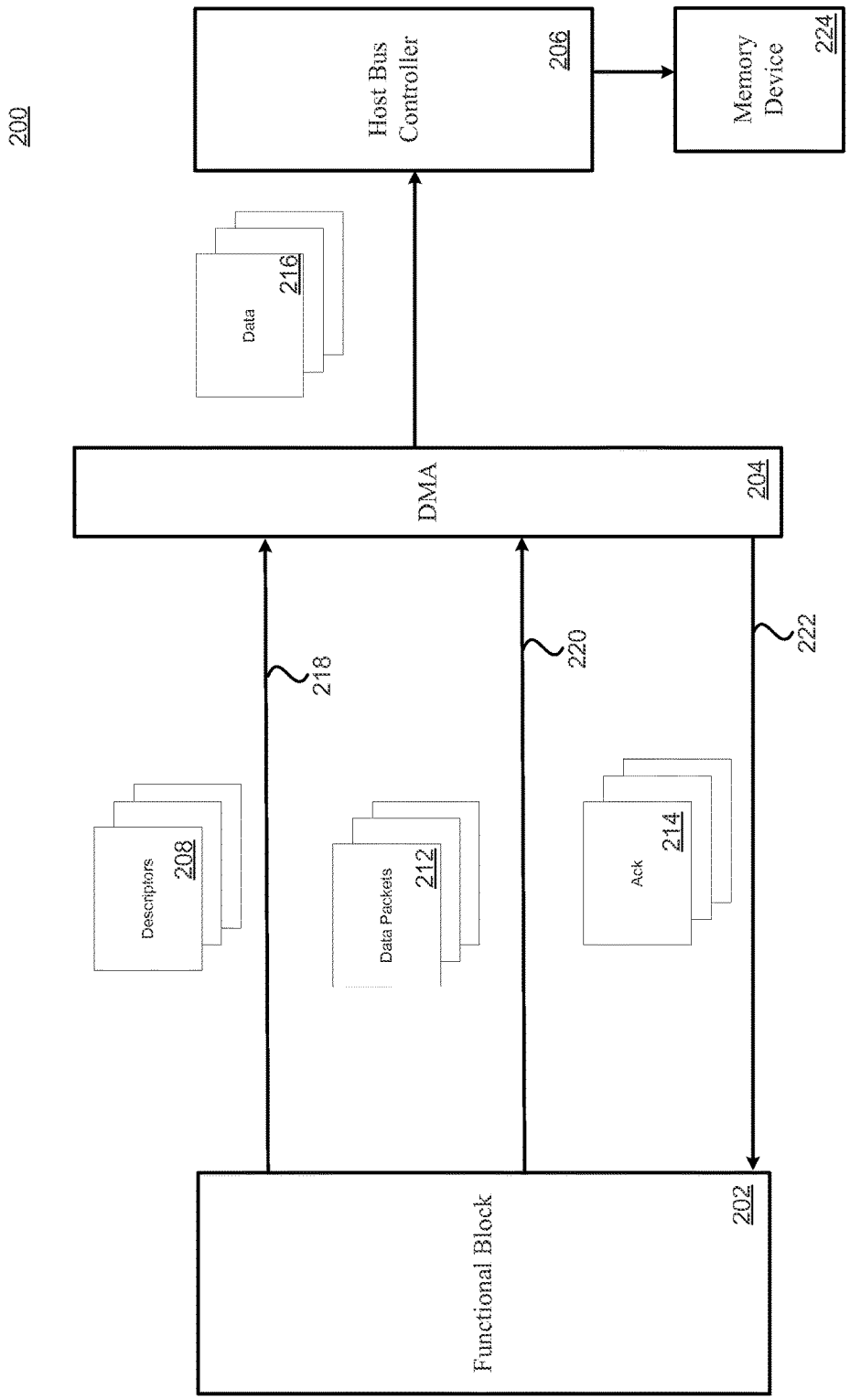
FIG. 2 illustrates a universal offload device configured to transmit data from a functional block.

FIG. 2 illustrates such a system 200 comprising a DMA engine 204 that can be configured to transfer data from functional block 202 to host bus controller 206. Functional block 202 can be any one of functional blocks 104, 106, 108, 118, or 120, for example. DMA engine 204 can be configured to communicate with functional block 202 through a standardized interface, such as an AXI stream interface. An AXI stream interface can be used to provide high bandwidth, low overhead data transmissions. Various pieces of data can be transmitted between functional block 202 and DMA engine 204. For example, function block 202 can transmit descriptor(s) 208 to DMA engine 204. As used herein, the term "streaming" means a technique for transferring data so that it can be processed as a steady and continuous stream.

Descriptors 208 can be referred to as work descriptors or packet descriptors. Generally speaking, work descriptors 208 can instruct a DMA engine how to function when interacting with a given functional block. Thus, although two DMA engines may have similar or identical physical interfaces and comprise similar or identical hardware components, each DMA engine can operate differently based on the respective work descriptor(s) that each DMA engine receives. Thus different instances of a common DMA engine design can be used to support different functional blocks. In some embodiments, the DMA engine 204 comprises a parser (examples of which are shown as 418 and 424 of FIG. 4) that extracts information from fields in the work descriptor 208. Examples of such information and fields are described herein. Based on the extracted information, a configuration component (examples of which are shown as 414 and 420 of FIG. 4) of the DMA engine 204 configures the DMA engine 204 to perform various operations using different subcomponents (examples of which are shown as 416 and 422 of FIG. 4) of the DMA engine 204.

Work descriptors 208 can contain information pertaining to the transfer of data to or from a memory location of a functional unit to or from a memory device (such as memory device 116 or external memory device 110). Internal memory of a functional block can be referred to as a buffer. For example, work descriptors 208 can contain a field defining whether un-concatenated data stored in an internal buffer of the universal DMA engine should be concatenated by a universal DMA engine prior to being transferred to a memory location. This can be useful for the case of a universal DMA engine being used in conjunction with an ethernet engine functional unit wherein data is generally concatenated prior to encapsulation in order to preserve bandwidth. Likewise, ethernet protocol data received by an ethernet engine can be concatenated and stored inside of a buffer of the ethernet engine. This concatenated data can be un-concatenated prior to being transferred to a memory location of the integrated circuit.

Work descriptors 208 can also contain data instructing a universal DMA engine to insert one or more memory barriers. Memory barriers can be used to constrain memory operations to a subset of data. For example, certain instructions can be isolated via memory barrier(s) and is commonly used for instructions processed by a CPU. However, ethernet engines generally do not utilize memory barriers for transmitting or receiving data. Therefore, a universal DMA engine can account for the requirements of a CPU and an ethernet engine by implementing the ability to variably insert or remove data barriers into data to be transferred by the universal DMA engine.

Work descriptors 208 can also contain various other fields to increase the ability of the DMA engine to service various functional blocks. A field of the work descriptor 208 can control whether the DMA controller sends cache invalidation requests to CPU(s) for memory to which data is being transferred to. This can be useful for CPU(s) that have an inclusive cache schema wherein corresponding cache entries to memory being written to should be invalidated. Work descriptors 208 can also contain a field to enable or disable interrupt flagging of a coupled functional block to, for example, interrupt the functional block when a data transfer is complete. Work descriptors 208 can also contain various data fields and/or pointers for the transfer of data to or from a buffer coupled to a functional block. These fields/pointers can contain, for example, first and last descriptors of packet to be transmitted or received, an identification of the current descriptor being transferred or received, or various other metadata fields that may be tailored or reserved for specific functional blocks or classes of functional blocks.

Streaming data packets are illustrated as being transferred to the DMA engine 204 from functional block 202 via interface 220. Interface 220 can be a streaming interface such as an AXI compliant streaming interface. The streaming data packets can be identified via the use of descriptors 208 as discussed herein. Descriptors 208 can be added to a queue inside of DMA engine 204. DMA engine 204 can perform various optimizations/prioritizations on queued data requests (via work descriptor 208) to increase the bandwidth of data transferred to or from a function block 202 or to or from a host bus controller 206, for example. Using the work descriptors 208, the data packet(s) 212 can be reformatted or otherwise altered before being transmitted as data 216 to a host bus controller 206 or other device. The host bus controller 206 can be configured to route data 216 to a memory device 224 which can be the memory device 116 or the external memory device 110 of FIG. 1, for example. Acknowledgements 214 can be transmitted between DMA engine 204 and functional block 202 to indicate to functional bock 202 that one or more data packet(s) 212 or work orders have been successfully received by the DMA engine 204 and/or data 216 has successfully been transmitted to host bus controller 206.

Figure 3:
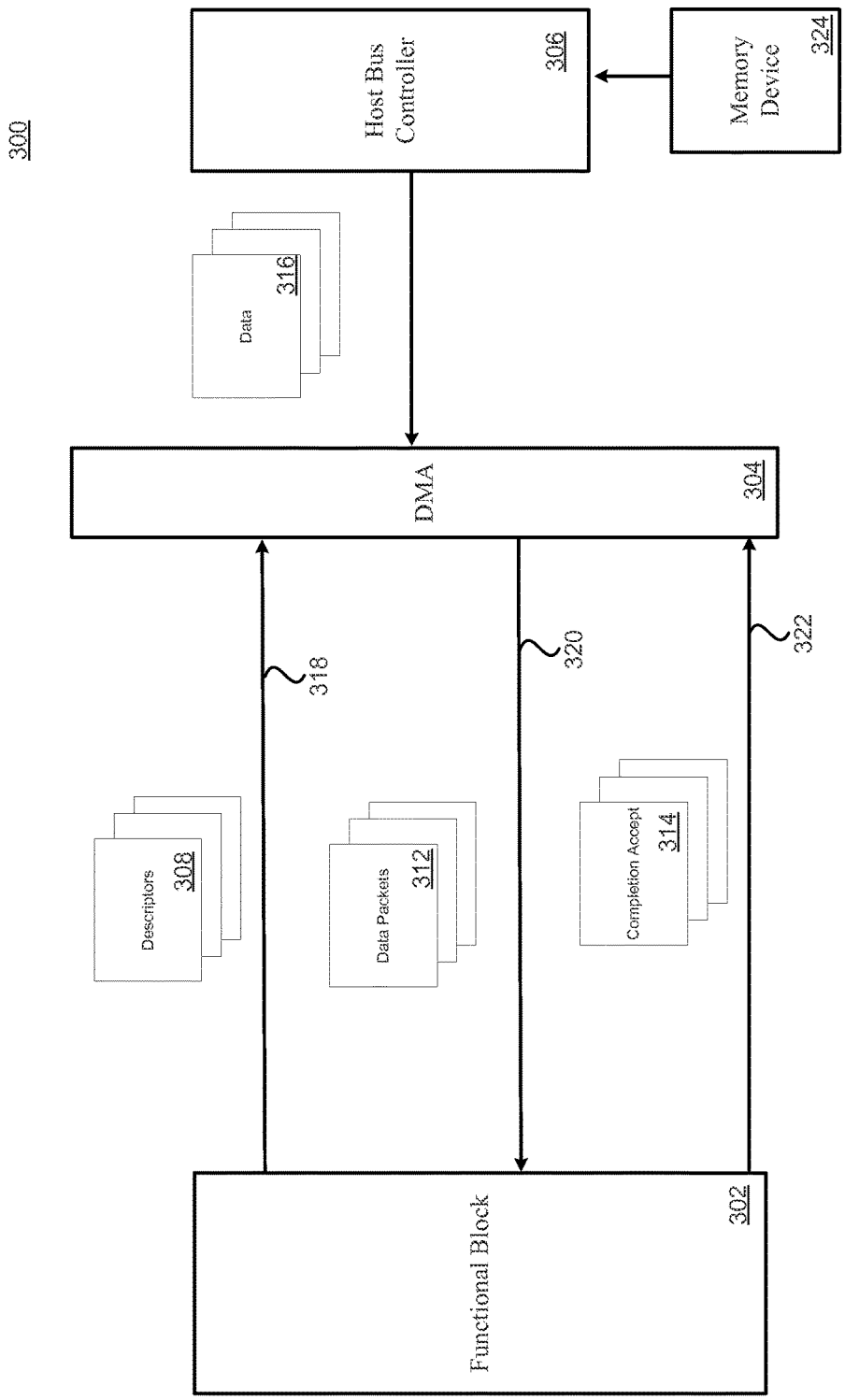
FIG. 3 illustrates a universal offload device configured to transmit data to a functional block.

FIG. 3 illustrates system 300 that can be a mode of operation of system 200. System 300 is configured such that functional block 302 receives data from DMA engine 304 (and ultimately from the host bus controller 306 and/or memory device 324). Note that system 300 utilizes descriptors 308 transferred from functional block 302 to DMA engine 304 similar to system 200. Descriptors 308 of system 300 can be queued by DMA engine 304 to indicate and/or prioritize data requested by functional block 302. Descriptors 308 can include similar data fields as described for the descriptors 208 of system 200. DMA engine 304 can request and receive data from host bus controller 306 and/or memory device 324 based upon the contents of descriptors 308. DMA engine 304 can then transfer data packet(s) 312 to functional block 302 in a format indicated by descriptors 308. Additionally, functional block 302 can transmit completion accept(s) 314 to the DMA engine to indicate successful transfer of data packet(s) 312 and/or work orders.

It should be understood that the features disclosed pertaining to system 200 and system 300 are not mutually exclusive. A DMA engine can operate in one mode to receive data from a functional block as illustrated in FIG. 2 and in a second mode to transmit data to a functional block as indicated by FIG. 3 in a time varying, simultaneous, or other method. System 200 and system 300 can therefore illustrate various modes of operation of a singular DMA engine. Descriptors 208 and 308 can be transmitted from a functional block to a singular DMA engine and received and processed by the singular DMA engine to enable transmitting and received of data by the functional block.

Figure 4:
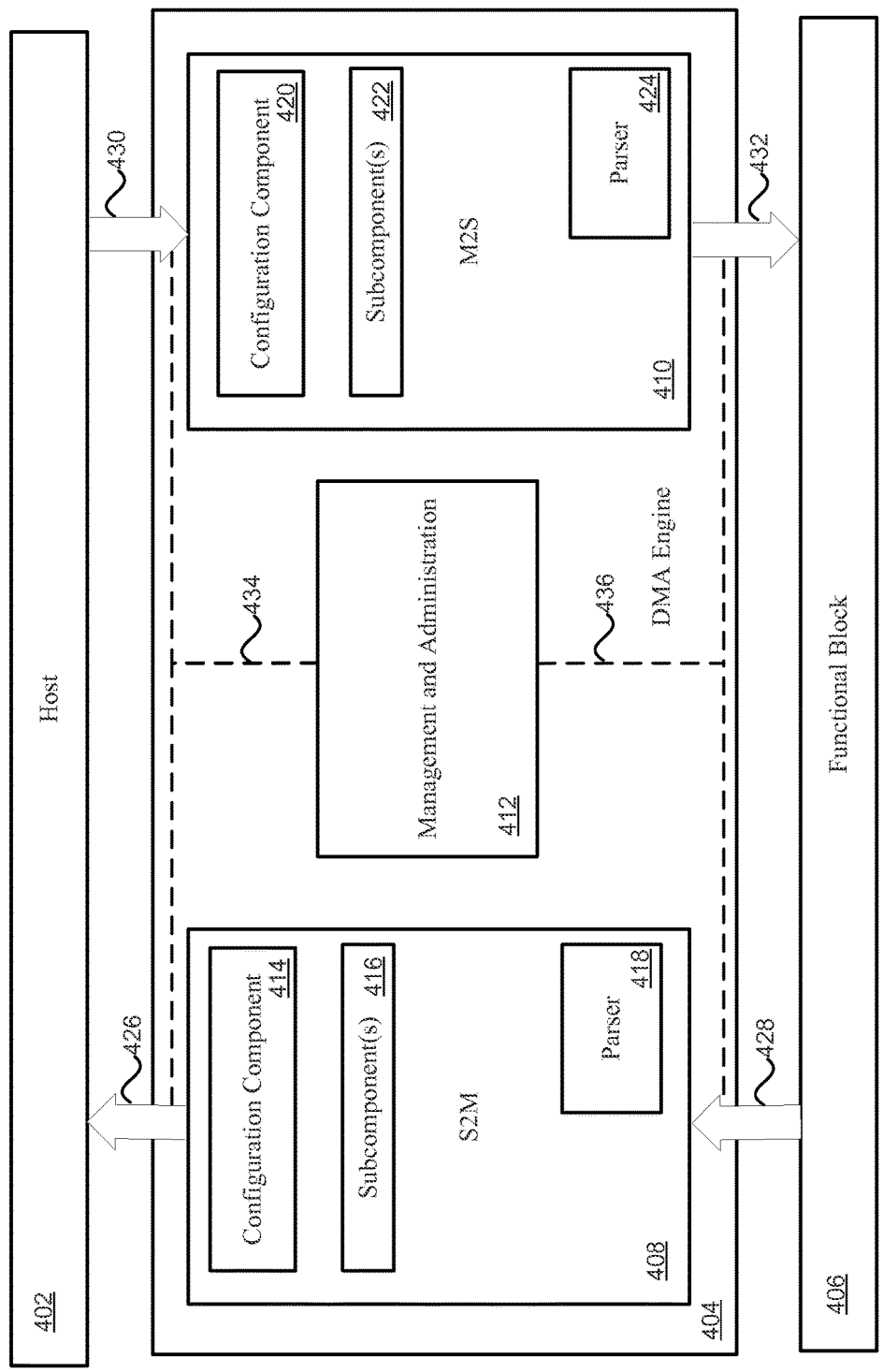
FIG. 4 illustrates a universal offload device encompassing several features of the disclosure.

FIG. 4 further illustrates several aspect of the disclosure. Illustrated is a system 400 that includes host 402, DMA engine 404, and Functional Block 406. Host 402 can be an SoC, a data plane, or other computing device that can host one or more DMA engines 404. Additionally, Host 402 can include a controller and/or memory. As disclosed herein, DMA engine 404 can serve to provide direct memory access functionality to Functional Block 406. That is to say, DMA engine 404 can accept memory read and write commands from Functional Block 406 and move data between memory of Functional Block 406 and Host 402 according to the read and write commands with minimal oversight by Functional Block 406. Functional Block 406 can be a hardware function, a software function, or a combination thereof. Host 402, DMA engine 404, and Functional Block 406 can be collocated on the same integrated circuit and/or die.

FIG. 4 illustrates several functional modules of DMA engine 404, namely S2M (i.e., Stream to Memory) module 408 and M2S (i.e., Memory to Stream) module 410. Additionally, a Management and Administration module 412 is also illustrated. S2M module 408 can be configured to stream information from Functional Block 406, reconfigure the streamed information, and store the reconfigured information in memory of or attached to Host 402. As disclosed herein, S2M module 408 and/or M2S module 410 can include a parser (416 and 420 respectively). Additionally, S2M module 408 and/or M2S module 410 can communicate with Functional Block 406 via one or more streaming interfaces/channels 426 and 428. For example, interface 424 can include several AXI streaming or other interfaces between Functional Block 406 and S2M module 408.

As one example, a streaming channel of interface 426 can be dedicated to data transferred from Applicant to S2M for eventual transfer to memory of Host 402. A different streaming channel can be dedicated to transferring previously disclosed work descriptor(s). Information parsed from work descriptors via parser 418 can be used by configuration component 414 to configured subcomponent(s) 416 of S2M module 408. Work descriptor(s) can also be streamed between Functional Block 406 and S2M module 408 using a common streaming channel. Therefore, parser 418 (and/or 424) can be used to parse work descriptor(s) transferred between DMA engine 404 and Functional Block 406 from data to be transferred between memory locations of Functional Block 406 and Host 402 even if the data and work descriptor are on the same streaming channel. Parser 418 or 424 can therefore strip metadata from a stream of information. The metadata can include work descriptors including disassembly or assembly instructions for memory transfers performed by DMA engine 404 as disclosed herein. These instructions can include, for example, rules for how to combine streaming data packets into a set of buffers and/or memory addresses.

M2S module 410 can operate in a similar manner as S2M module 408, however, M2S module 410 can be configured to retrieve data stored in memory of host 402 and stream the data to Functional Block 406 according to work descriptors provided by Functional Block 406. The work descriptors can include instructions for assembling stream packets from a set of buffers (not shown) of DMA engine 404. The work descriptors can include instructions pertaining to a variety of different types of concatenation or other memory organization rules as disclosed herein. Using these instructions, data can be gathered from various memory locations of Host 402 and assembled in various manners to support a wide variety of different functional blocks.

M2S module 410 and S2M module 408 are illustrated as being separate functional modules, but the modules can share various components as will be further disclosed. DMA engine 404 can support any number of separate or combined M2S or S2M modules as needed to enable higher throughput or to conform to available die space. Interfaces 426-432 can include streaming, serial, and/or parallel interfaces. Interfaces 426-432 can be of various bit widths and operate at various frequencies to support a variety of data transmission speeds and protocols. Interfaces 426-432 can support synchronous or asynchronous transmissions.

Management and Administration Module 412 can provide oversight and management of interfaces 426-432. For example, Management and Administration Module 412 can be used to enforce Quality of Service (QoS) rules for different types of data being transmitted via interfaces 426-432. A priority of a given data stream can be provided by an associated work descriptor, for example. However, this priority can also be modified by the Management and Administration Module 412, or other modules, using various techniques and algorithms to improve utilization of interfaces 426-432, QoS, or other aspects. As one example, a priority associated with a given data stream can be dynamically incremented whenever a different data stream is serviced so that a low priority data stream eventually is serviced and is not continually passed over for higher priority data streams. The ability of Management and Administration Module 412 to manage data transmitted via interfaces 426, 428, 430, and 432 is visually represented by the Management and Administration Module 412 being coupled 434 and 436 to the interfaces.

Management and Administration Module 412 can also serve as an interrupt controller to provide interrupts to Functional Block 406 or Host 402 to signal the completion of a memory transfer or to signal a fault condition, for example. Management and Administration Module 412 can also support error collection and reporting. As another example function of Management and Administration Module 412, the module can be used to support cross DMA engine 404 communications. As DMA engine 404 can be universal and support various different types of functional blocks, it can be instanced multiple times within an electronics device/integrated circuit. DMA engines 404 thus instanced can therefore have substantially similar logical and/or functional characteristics. In other words, instanced DMA engines 404 can respond substantially identically when provided the same inputs and when operating in the same state. This can be accomplished by using DMA engines having the same physical characteristics (e.g., similar arrangement of logic gates/structures, layers of deposition, etc.) and/or having interfaces with the same physical characteristics (e.g., same voltage, timing, rise-fall, or other characteristics). The common design of DMA engine 404 can aid in standardizing and implementing communications between DMA engines that previously would be untenable. These communications can aid in instances, for example, wherein virtualized devices are used in conjunction with DMA engines and/or functional blocks. Alternatively or additionally, cross communications between DMA engines can be used to effect one or more prioritization schemas between DMA engines. For example, QoS data associated with streams of data between DMA engines can be transmitted and shared between DMA engines. This information can be used to prioritize certain streams of data over others and can be used to more efficiently utilize buses of an electronic device/integrated circuit.

Figure 5:
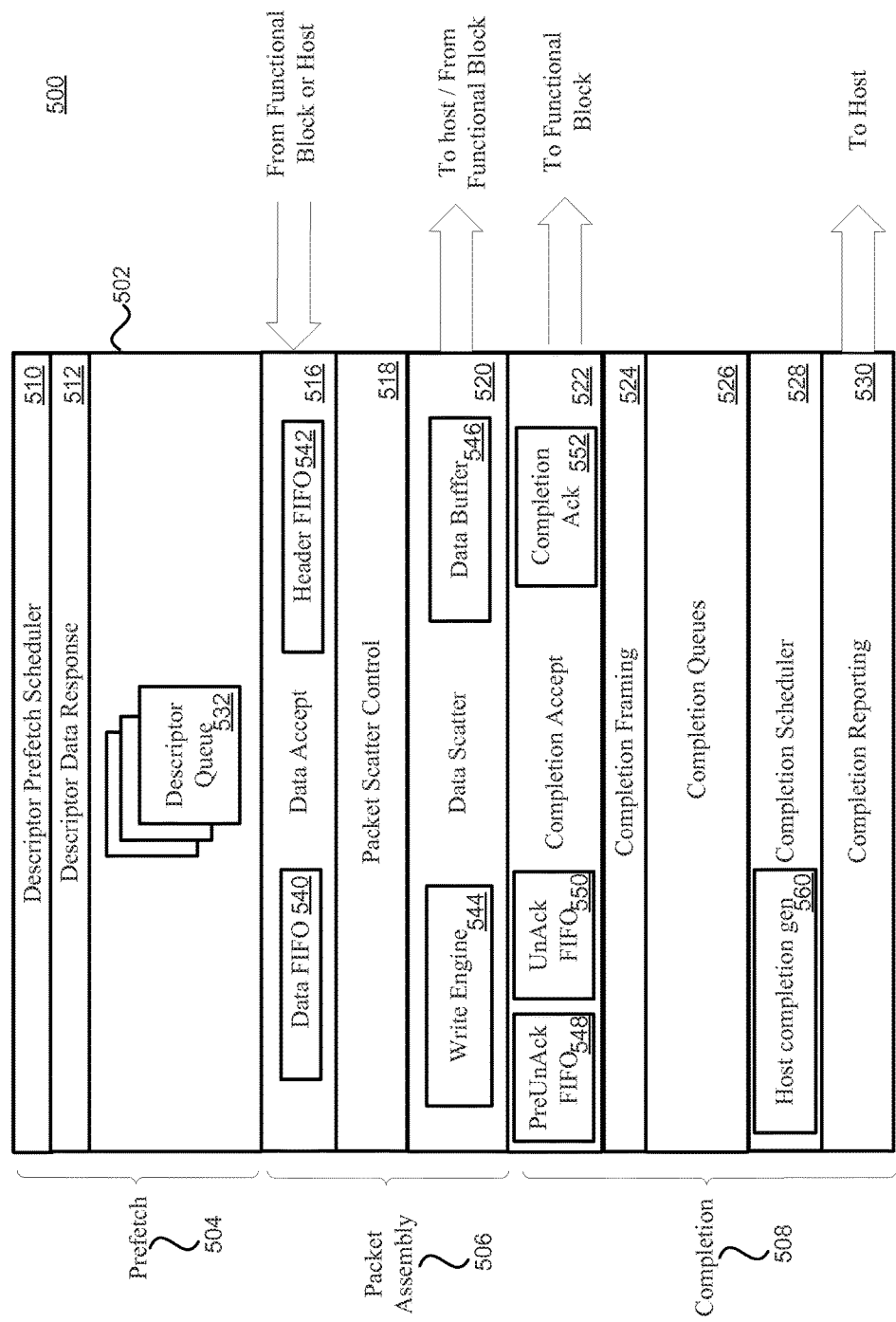
FIG. 5 illustrates a notational S2M module of universal offload device encompassing several features of the disclosure.

FIG. 5 is an illustration of several notional components of S2M module 502. S2M module 502 can serve as S2M module 408 of FIG. 4. S2M module 502 is illustrated as including three categories of functional blocks, namely a prefetch engine 504, a packet disassembly engine 506, and a completion engine 508. The prefetch engine 504 can serve to manage descriptor pre-fetch flows and methods for functional block requests to stream information to a host. The packet disassembly engine 506 can be used to translate high level work flow descriptor transfer requests into lower level data streaming transfers. For example, a work descriptor can be parsed to obtain instructions to obtain data from one or more memory locations of an functional block and combine or rearrange the data according to certain rules obtained from the work descriptor(s). The packet disassembly engine 506 can translate the high level instructions of the work descriptors into lower level data streaming requests to transmit the desired data in the desired format. The completion engine 508 can be used to track when a certain data transfer request (associated with a work descriptor for example) is completed and signal a host and/or functional block of the completion. The completion engine can also combine multiple completion messages into one in order to more efficiently utilize communication interfaces between the DMA engine and a host and/or functional block.

The prefetch engine 504 is illustrated as including descriptor prefetch scheduler 510 module, descriptor data response module 512, and descriptor queue 532. Descriptor prefetch scheduler 510 can be used to schedule data for submittal to a host (or host controller) that can be associated with work descriptors. Work descriptors can be received from an functional block associated with the DMA engine/ S2M module. These work descriptors can contain information pertaining to requests by the functional block to stream data from the functional block to a host. Descriptor prefetch scheduler 510 can contain rules based on availability of memory space (within the DMA engine, in the host, or in other locations), the number or type of pending tasks of the DMA engine, various thresholds of data rates or bus utilization, and/or QoS rules. The rules can be used to schedule and select work descriptors to be read by S2M module 502 from an associated functional block.

Descriptor data response module 512 can receive packet headers from packets streamed from an functional block to an associated DMA engine. Descriptor data response module 512 can utilize packet headers received by the packet disassembly engine 506 to extract or build associated work descriptors and store the work descriptors in descriptor queue 532. Descriptor prefetch scheduler 510 in conjunction with descriptor data response module 512 can be used to schedule work descriptors in the descriptor queue 532 to optimize data transfers between a DMA engine and a host. For example, various data buffers received by a DMA engine can be reorganized and packaged according to rules of the host interface. This can include reorganizing data received via several received data streams from an application into a singular stream/data packet to a host and vice-versa (e.g., breaking a singular stream into several streams/packets). Prefetch engine 504 can also implement prefetch promotion functionality to address received work orders that may be in distress. For example, the prefetch engine 504 can detect if a received work order does not have enough information to complete the transfer of data. This can occur if there are an insufficient number of work descriptors associated with a work order. Alternatively or additionally, the projected packet size may be too large for the memory space designated for a work order to be transferred into, or too large for internal memory of the DMA engine. In instances such as these, the prefetch engine 504 can promote the scheduling of certain work descriptors to complete the number of work descriptors needed for the associated work order. Prefetch engine 504 can also indicate an error and/or request retransmittal of work descriptors.

The packet disassembly engine 506 is illustrated as including data accept module 516, packet scatter control module 518, and data scatter module 520. Data accept module 516 can read packet headers from data streamed from an functional block including extracting packet header information into header FIFO 542 and extracting payload data into data FIFO 540. In response to the storing of the packet header information and the payload data, packet scatter control module 518 can process incoming streams from a functional block. Packet scatter control module 518 can also use prefetched descriptors from descriptor queue 532, for example. Using this information, the packet scatter control module 518 can direct streamed data to be stored in a data buffer and/or streamed to the host in a specified format/order. Packet scatter control module 518 can also provide information to the Completion engine 508 as will be further discussed herein. Such information can include identification information of completed data transfers, errors in transferring data, or other information. Data scatter module 520 can align data based upon interface rules with the host interface, buffer orientation, and/or by direction from packet scatter control module 518. For example, packet scatter control module 518 can direct data scatter module 520 to pull data from buffers in an order other than the received order from the functional block.

Completion engine 508 can contain auxiliary structures for serving a fluent staged/pipelined completion reporting operation and can include PreUnAck and UnAck processing structures. PreUnAck and UnAck processing structures can log and propagate PreUnAck and UnAck indications from data engines through a DMA data transfer process until completion and a completion report to a host can be generated. Completion engine 508 can include completion accept module 522, completion framing module 524, completion queues 526, completion scheduler module 528 and completion reporting module 530. Completion accept module 522 can receive indications that packets are in progress of being transmitted. One such indication can be an unacknowledgement (UnAck) indication than can be stored in UnAck FIFO 550. Another indication can be a pre-unacknowldegement (PreUnAck) indication that can be stored in PreUnAck FIFO 548, for example. These indications can be used by Completion Engine 508 to associate data transferred by packet scatter control module 518 and a completion report. Additionally, as a data transfer can be associated with a work descriptor, the indications can be used to associate a specific completion report with a specific work descriptor. For example, a PreUnAck indicator can be associated with a particular data transaction/buffer between a DMA engine and a host. UnAck can be associated with an overall data transaction associated with a work descriptor. A work descriptor can describe one or more data transfers from one or more buffers. The indicators can be used as status indicators for these transfers. Completion framing module 524 can be used to assemble a final completion descriptor. A final completion descriptor can contain one or more indications of completed data transfer(s) and/or one or more error or maintenance reports. This information can temporarily be stored in various completion queues 526. Completion queues 526 can include one or more queues, each associated with a QoS priority level of other grouping of messages to improve host bus utilization. For example, each queue can collect sporadic completion messages for later coalescence into a single message/transmission to a host. Completion queues 526 can be tailored to correspond to rules of the host interface. For example, if the host interface is an AXI bus, the queues can include a queue for framing protocols and flows for inserting information into coalescing storage and a queue that maintains information pertaining to eviction of transactions. Completion scheduler module 528 can format the final completion descriptor for transfer to a host according to specifications of an interface with the host. As such, the completion scheduler module 528 can include a Host completion generator (gen) 560 or other type of generation module to initiate and populate data transfer between the Completion engine 508 and a host. The completion scheduler module 528 can optionally contain functionality to promote completion information in completion queues 526 if there is a congestion between unacknowledgements and the completion information, for example. Completion reporting module 530 can be used to set interrupts and/or increment ring pointers to buffers containing data to signal to the host and/or functional block that the data transfer is complete and/or communicate the location of buffers for further data transfer.

Figure 6:
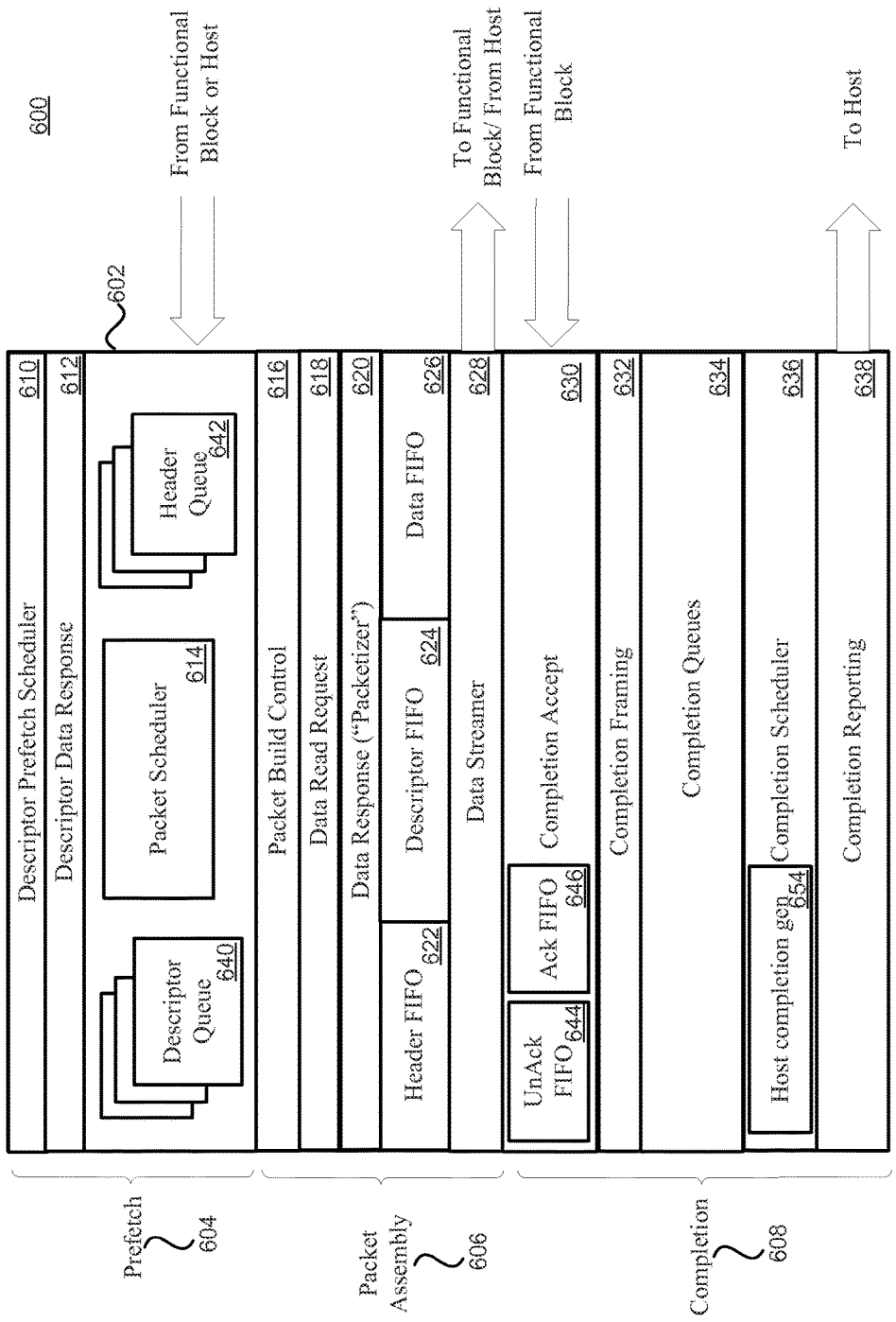
FIG. 6 illustrates a notional M2S module of universal offload device encompassing several features of the disclosure.

FIG. 6 is an illustration of several notional components of M2S module 602. M2S module 602 can serve as M2S module 410 of FIG. 4. M2S module 602 is illustrated as including three categories of functional blocks, namely Prefetch Engine 604, Packet Assembly Engine 606, and Completion Engine 608. Prefetch Engine 604 can serve to manage descriptor pre-fetch flows and methods for functional block requests to stream information from a host. Prefetch Engine 604 can include functionality to build packet headers from received work descriptors for later processing by Packet Assembly Engine 606. Packet Assembly Engine 606 can be used to translate high level work flow descriptor data transfer requests into lower level data streaming transfers. For example, a work descriptor can be parsed to obtain instructions to obtain data from one or more memory locations of a functional block and combine or rearrange the data according to certain rules obtained from the work descriptor(s). The Packet Assembly Engine 606 can translate the high level instructions of the work descriptors into lower level data streaming requests to transmit the desired data in the desired format. The completion engine 608 can be used to track when a certain data transfer request (associated with a work descriptor for example) is completed and signal a host and/or functional block of the completion. The completion engine can also combine and/or tally multiple completion messages in order to more efficiently utilize communication interfaces between the DMA engine and a host and/or functional block.

Prefetch Engine 604 is illustrated as including descriptor prefetch scheduler module 610, descriptor data response module 612, descriptor queue 640, header queue 642 and packet scheduler module 614. Descriptor prefetch scheduler module 610 can be used to schedule data for retrieval from a host (or host controller) that is associated with work descriptors. The work descriptors can be received from a host or a functional block. The work descriptors can contain information pertaining to requests from the host or functional block to stream data from the host to the functional block. Descriptor prefetch scheduler module 610 can contain rules based on availability of memory space (within the DMA engine, in the host, or in other locations), the number or type of pending tasks of the DMA engine, various thresholds of data rates or bus utilization, and/or QoS rules. The rules can be used to schedule and select work descriptors to be read by the M2S module 602 from a functional block or host or to schedule creation of packet header(s) by Descriptor data response module 612.

Descriptor data response module 612 can utilize work descriptors received by M2S module 602 to extract or build associated packet headers. Descriptor data response module 612 can then push associated descriptors and packet headers into descriptor queue 640 and header queue 642 respectively. The Prefetch Engine 604 can also indicate an error and/or request retransmittal of headers/work descriptors. The packet scheduler module 614 can be used to select pending data transfers (such as transfers described by work descriptors) and headers stored in the descriptor queue 640 and header queue 642. Packet scheduler 614 can implement several rules and/or algorithms using rate limiting or rate control per queue or per stream to selecting pending orders to process from the queue(s). Additionally, a descriptor can be a dummy descriptor in which no data needs be transferred from a host to an functional block in response to the dummy descriptor. In such a case, packet scheduler module 614 can directly send the dummy descriptor information to the completion engine 608, bypassing the Packet Assembly Engine 606 as the functionality of the Packet Assembly Engine 606 may not be needed.

The Packet Assembly Engine 606 is illustrated as including packet build control module 616, data read request module 618, data response module 620, several FIFOs, and data streamer module 628. The packet build control module 616 can accept back header and descriptor information from the descriptor queue 640 and header queue 642 of the prefect engine 604, for example. Using the information contained within these queues, the pack build control module can manage the flow of data between the various modules of the Packet Assembly Engine 606. The pack build control module can associate each work descriptor with a buffer of a DMA engine and route metadata (such as memory addresses or concatenation preferences) to the appropriate module or FIFO. Data read request module 618 can separate buffer requests from the packet build control module 616 to correspond to interface characteristics of the interface between the M2S module 602 and an functional block. For example, data read request module 618 can separate the buffer request into distinct sections, each within burst limits of the functional block interface.

Data response module 620 can format data to correspond to interface characteristics prior to transferring the data into the buffer(s) reserved by data read request module 618. This reformatting can include, for example, packing or concatenating the data or block alignment. This data can temporarily be stored in data FIFO 626 along with corresponding header and work descriptor information stored in header FIFO 622 and descriptor FIFO 624 respectively. Data streamer module 628 can then submit the reformatted data to a functional block by retrieving the data from data FIFO 626 and/or buffer(s). Data streamer module 628 can also contain functionality to terminate the data stream in case of a transmission or other error and report such error information to the completion engine 608.

Completion engine 608 can include a completion accept module 630, completion framing module 632, completion queues 634, completion scheduler module 636 and completion reporting module 638. Completion Accept module 630 can receive indications that packets are in progress of being transmitted. One such indication is an unacknowledgement (UnAck) indicator from the Prefetch Engine 604 than can be stored in Unack FIFO 644. Another indication can be an acknowledgement (Ack) indicator from the functional block that can be stored in Ack FIFO 646, for example. These indications can be used by a DMA engine to, for example, associate a data transfer with a work descriptor and/or to generate a completion report. UnAck indicator can signal that a particular data transfer is currently in progress to a functional block. Ack indicator can be received from a functional block to indicate that a data transfer has successfully been received. These indicators can be used to signal to a completion engine 608 to transmit a completion report and/or for a DMA engine to retry certain data transfers, for example. UnAck indicators can also be stored in Completion engine 608 and used to prevent stalls when transferring data to a functional block. For example, an UnAck indicator can be associated with a current data transfer and stored when the current data transfer is complete. A following data transfer can proceed without awaiting for an associated Ack indicator to the stored UnAck indicator. In this sense, the Unack indicator can dissociate transferred data from the ability to detect when the transfer has been completed (acknowledged by a functional block). Completion framing module 632 can be used to assemble a final completion descriptor. The final completion descriptor can contain one or more indications of completed data transfer(s) and/or one or more error or maintenance reports. This information can temporarily be stored in various completion queues 634. Completion queues 634 can include one or more queues, each associated with a QoS priority level of other grouping of messages to improve host bus utilization. For example, each queue can collect sporadic completion messages for later coalescence into a single message/transmission to a host. Completion queues 634 can be tailored to correspond to rules of the host interface. For example, if the host interface is an AXI bus, the queues can include a queue for framing protocols and flows for inserting information into coalescing storage and a queue that maintains information pertaining to eviction of transactions. Completion scheduler module 636 can format the final completion descriptor for transfer to a host according to the specifications of the interface with the host. As such, completion scheduler module 636 can include a Host completion generator (gen) 654 or other type of generation module to initiate and populate the data transfer between the Completion engine 608 and the host. Completion reporting module 638 can be used to set interrupts and/or increment ring pointers to buffers containing data to signal to the host and/or functional block that a data transfer is complete.

The parser 418 of FIG. 4 can include one or more modules or functionalities of modules illustrated in FIG. 5. Likewise, Parser 424 can include one or more modules or functionalities of modules illustrated in FIG. 6. For example, Parser 418 can include functionality of prefetch engine 504, data accept module 516 or other modules. Parser 424 can include functionality of prefetch engine 604, packet build control 616, and/or data read request 618. Similarly, configuration component 414 can include functionality of packet scatter control 518 or other modules and configuration component 420 can include functionality of data response module 620 or other modules. Subcomponent(s) 416 can include functionality of data scatter module 520, the completion engine 508 or functionalities of other modules. Subcomponent(s) 422 can include functionality of data streamer module 628, the completion engine 608 or functionalities of other modules.

Table 1 illustrates an example description of a work descriptor. A work descriptor can comprise any number of bits. Additionally, bits can be appended to the work descriptor to provide more space for metadata information as needed. Some bits (such as Special_MetaData_descriptor, for example) can be used to indicate alternate configurations of work descriptors which can indicate to the DMA and/or functional block that the metadata and/or the work descriptor itself have alternate bit assignments and/or functions.

TABLE 1

Example Work Descriptor

| Bits | Name | Description |
| --- | --- | --- |
| Word 0 | | |
| 31 | Concatenate/ Reserved | 0 - don't concatenate (initiate transmission using current buffer data aligned to the BUS) 1 - Concatenate (enable concatenation of data associated with the current |

TABLE 1-continued

Example Work Descriptor

| Bits | Name | Description |
|---|---|---|
| | | descriptor with previous data) |
| 30 | Data_memory_barrier/ Reserved | 0 - No data barrier<br>1 - Utilize data barrier |
| 29 | No_Snoop_Hint | 0 - Cache snoop<br>1 - No cache snoop |
| 28 | Interrupt Enable | 0 - no interrupt initiated<br>1 - interrupt initiated |
| 27 | Last_in_transaction | 1 - Current descriptor is the last descriptor of a packet<br>0 - Current descriptor is not the last descriptor of a packet |
| 26 | First_in_transaction | 1 - Current descriptor is the first descriptor of a packet<br>0 - Current descriptor is not the first descriptor of a packet |
| 25:24 | Ring_ID | Indicates the ID of the current descriptor ring in operation |
| 23 | MetaData Descriptor | 1 - Current descriptor contains metadata<br>0 - Current descriptor does not contain metadata |
| 22 | Reserved/ Special_MetaData_descriptor | 1 - Current descriptor contains alternate metadata<br>0 - Current descriptor does not contain alternate metadata |
| 21:0 | Reserved/ Word_0_MetaData [21:0] Word 1 | Metadata information<br><br>Buffer descriptor Word_1_MetaData [31:0] |
| 31:0 | Reserved/ Word_1_MetaData [31:0] Word 2 | Metadata information |
| 31:0 | Buffer_Pointer_Low/ Word_2_MetaData Word 3 | Buffer_Pointer [31:0] |
| 31:0 | Buffer_Pointer_High/ Word_2_MetaData | Buffer_Pointer [63:32] |

Figure 7:
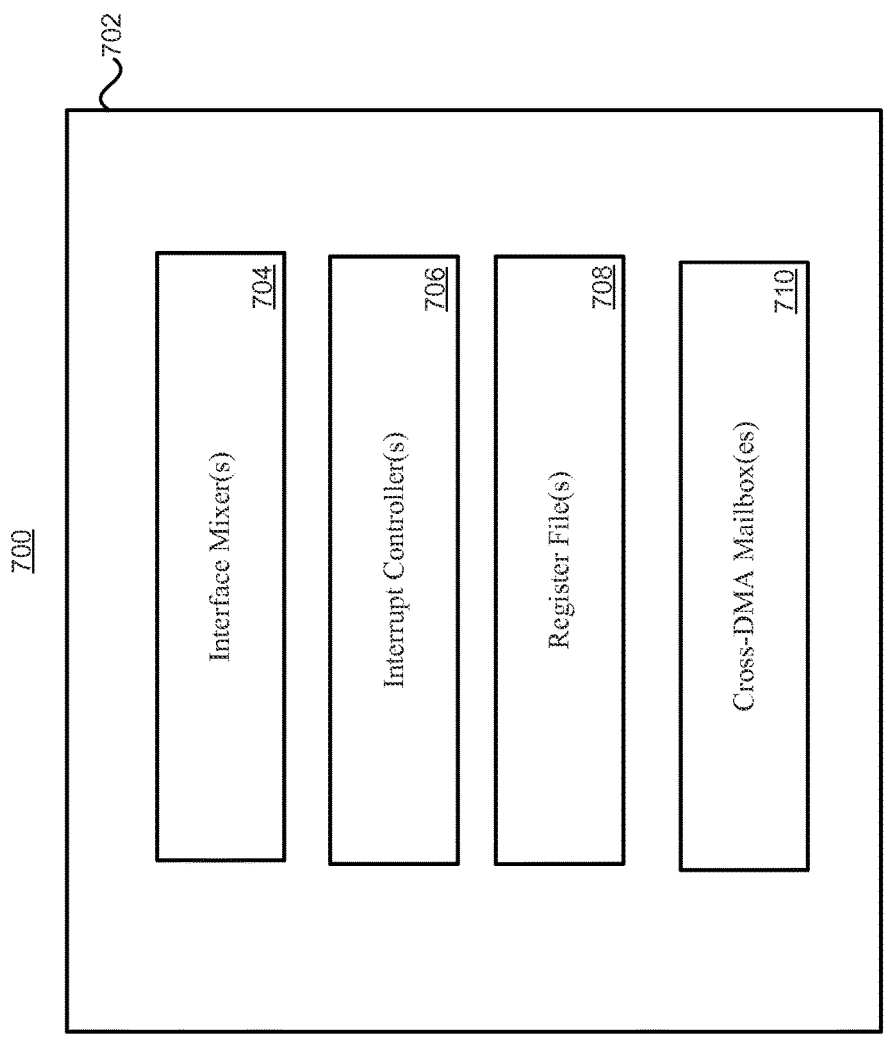
FIG. 7 illustrates a notional Management and Administration module of universal offload device encompassing several features of the disclosure.

FIG. 7 illustrates a Management and Administration module 702 that can be Management and Administration module 412 of FIG. 4. Management and Administration module 702 is illustrated as including one or more interface mixers 704, one or more interrupt controllers 706, one or more register files 705, and one or more cross-DMA mailboxes 710. The interface mixer(s) 704 can be used to arbitrate between different channels used by a DMA engine. For example, a DMA engine can communicate using AXI channels wherein a certain number of channels are dedicated for reads and a certain number of channels are dedicated for writes. These channels may, or may not, be shared by M2S or S2M modules of a DMA engine. As such, the use of these channels can be arbitrated by the host mixer(s) 704. Each group of read channels and each group of write channels can be coupled to a dedicated mixer according to QoS rules, for example. A QoS level can be assigned to a specific channel or to a specified group of memory transactions. For example, a QoS indicator can be assigned to each memory transaction. Arbitration can be performed by using a round robin assignment to memory transactions with similar or the same QoS indicator. For memory transactions having differing QoS indicator levels, the memory transactions with a higher priority associated QoS indicator can be serviced first. Additionally, the QoS indicator can be dynamic and some memory transactions can be promoted if it is passed over repeatedly, for example, or if a channel with a specified QoS level has additional bandwidth.

Several interrupt controller schemas can be used via the use of the one or more interrupt controllers 706. As one example, a bi-level interrupt controller hierarchy can be used. A primary interrupt controller can be used to report architectural events such as memory transaction completions. A secondary interrupt controller can be used for local (to the DMA engine) error reporting. One or more interrupt controllers can be assigned to different modules or engines of a DMA engine. For example, an M2S module can have a dedicated controller and an S2M module can have a dedicated controller. The one or more register files 708 can include various configuration, management, statistics, status logging, and/or error reporting information. This information can be accessed by the host, functional block, or a debugger as needed to collect error or usage information to improve or correct the functioning of the DMA engine or the electronic device to which the DMA engine is coupled. For example, a specific DMA engine may be underutilized and therefore future revisions of the electronic device may limit the capabilities of the specific DMA engine to save die space and power. Alternatively, a DMA engine can be enlarged or given more capabilities. Alternatively, a configuration of the DMA engine may be adjusted such that memory transactions operated at a higher or lower base QoS level on the DMA engine to alter its utilization relative to the rest of the system. The Management and Administration module 702 can also be used as a back door into the operation of the DMA engine. In this mode, the Management and Administration module 702 may include an alternative interface so that a user can debug the operation of the DMA engine, such as for development purposes.

As the M2S module 410 and the S2M module 510 can contain similar components with similar functionality, this functionality can be shared between the modules. For example, a common prefetch engine may be implemented to service both the M2S and S2M modules. Alternatively, a DMA engine may comprise multiple M2S or S2M modules in any combination. In this manner, a DMA engine can be tailored to meet data throughput demands of an functional block and/or host.

It should also be understood that the DMA engines disclosed herein can be configured to communicate with a host bus controller. A host bus controller may have control over the management and priority of devices which the host bus controller services. As one example, the host bus controller may be a master controller wherein each of the DMA engines is a slave to the master controller. In this example, the bus controller could control when each DMA engine has control over the shared bus. Additionally, the bus can be shared with various other devices of an electronics device. Therefore, the DMA engines can be configured to communicate with the host bus controller and can be configured to influence the priority of transmitted data by reporting various QoS or other priority levels to the host bus controller, but the DMA engines may not have ultimate control over host bus arbitration.

DMA engines disclosed herein can be coupled to and service a plurality of functional blocks/applications. For example, a single universal DMA engine can provide a certain amount of bandwidth for DMA operations. This bandwidth can be allocated to more than one functional block and each functional block can provide differing functionality. For example, a multiplexer can be used to dynamically switch between interface/communication lines between the singular DMA engine and the two or more functional blocks. The disclosed communication and interface schemas for implementing universal DMA engine functionality can then be used to communicate with the two or more functional blocks. For example, the functional blocks can each provide work descriptors for DMA memory operations. The multiplexer can be coupled to the DMA engine (or other circuitry) to allow the DMA engine to control which functional block is currently being communicated with.

Figure 8:
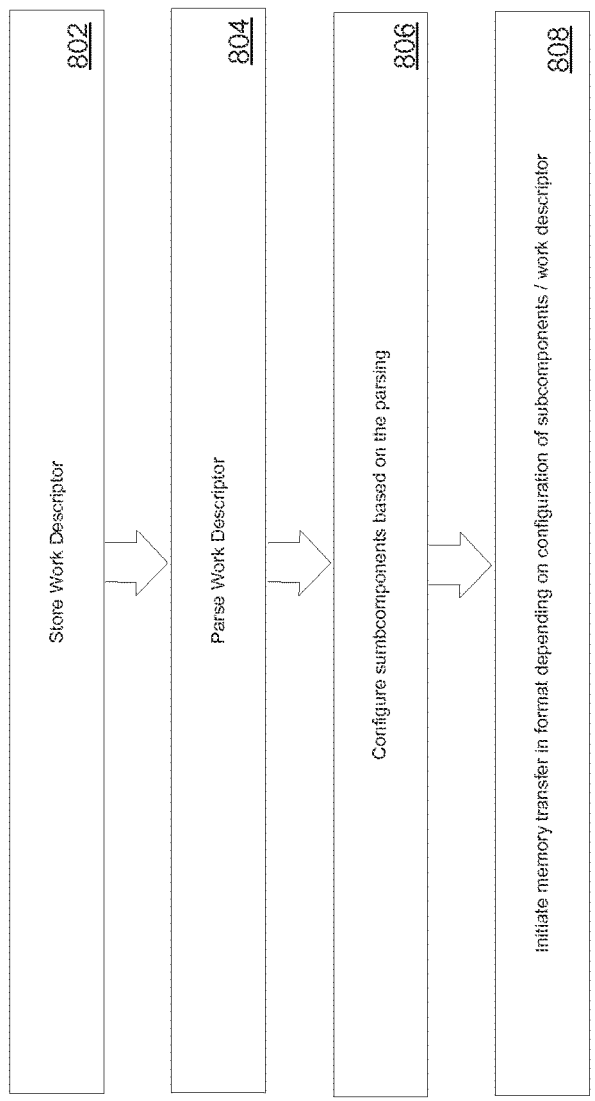
FIG. 8 illustrates a notional method of operating a universal offload device embodying one or more features of the disclosure.

FIG. 8 illustrates a notional flow chart 800 of a method for operating a DMA engine embodying features of the disclosure. Flow chart 800 includes the steps of receiving a work descriptor 802, parsing the work descriptor 804, configuring subcomponent(s) 806, and initiating a memory transfer 808. At step 802, a work descriptor can be stored by the DMA engine. The work descriptor can be initiated by a functional block as described herein. The work descriptor can be passed to the DMA engine either directly, a pass by address, or through other means. The work descriptor can contain instructions pertaining to how data should be transferred and/or reorganized by the DMA engine. As one example, the work descriptor can include originating and/or destination addresses, concatenation flag(s), memory barrier flag(s), or various other types of metadata disclosed herein. The work descriptor can comprise any number of bits and can be transferred via a digital, analog, or other signal to the DMA engine. The DMA engine can receive the work descriptor via a transceiver or other device and pass the received work descriptor to a parser using internal memory of the DMA engine.

At step 804, the stored work descriptor can be parsed by the DMA engine. During the parsing, the various contained metadata can be separated from the stored work descriptor. The parsing can include decompression or decryption. The parsing can follow a set of rules wherein the protocol and/or work descriptor format can be predefined such that a functional block and DMA engine conform to the same protocol and/or work descriptor. The format of the work descriptor can also be adaptive such that a portion of a received work descriptor or other data can be used to dynamically define the format of a work descriptor. The parsing can also include a combination of one or more work descriptors.

At step 806, one or more subcomponents of the DMA engine can be configured based, at least in part, on the configuration of the parsed work descriptor information. The configuration of the subcomponents can be performed to effectuate multiple operations by the DMA engine. As one example, data can be received by the DMA engine and then rearranged in different sequencing depending upon the work descriptor configuration. The configuration of the work descriptor can also dictate concatenation rules for data transferred by the DMA engine. The configuration of the work descriptor can also comprise a QoS level of data to be transmitted, the length of data to be transmitted, the originating and/or destination address of the data to be transmitted, or various other pre or post processing information. The configuration of a work descriptor can contain encryption cypher(s) for example that are stored in a secondary memory location to the primary data stream to which the cypher(s) are associated with.

At step 808, the DMA engine can initiate a data transmission based, at least in part, on the configuration of the work descriptor. The transfer of data can be accomplished by the DMA engine reading data from internal buffers of a functional block, from memory coupled to a host, or from other locations. The data read by the DMA engine can be temporarily stored in memory coupled to the DMA engine or it can be directly streamed between a source and destination. Various operations can be performed on data temporarily stored in memory including the aforementioned concatenation, memory barrier insertion, and/or data reordering operations.

Figure 9:
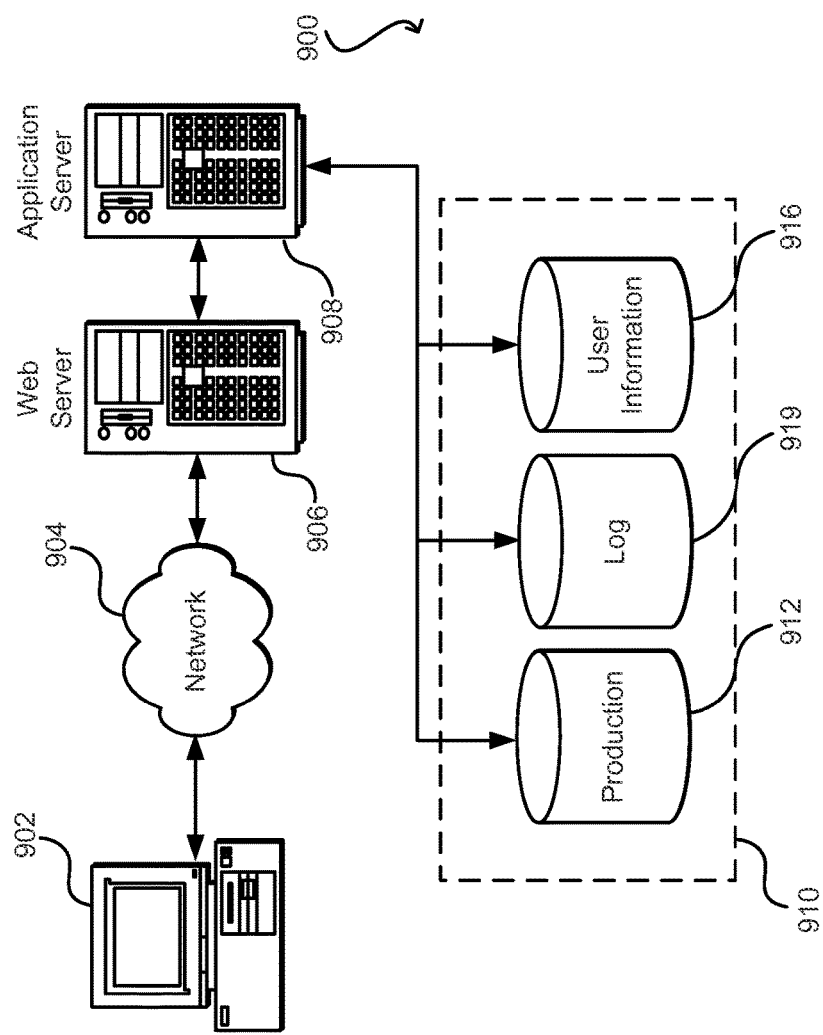
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for a functional block. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

Figure 10:
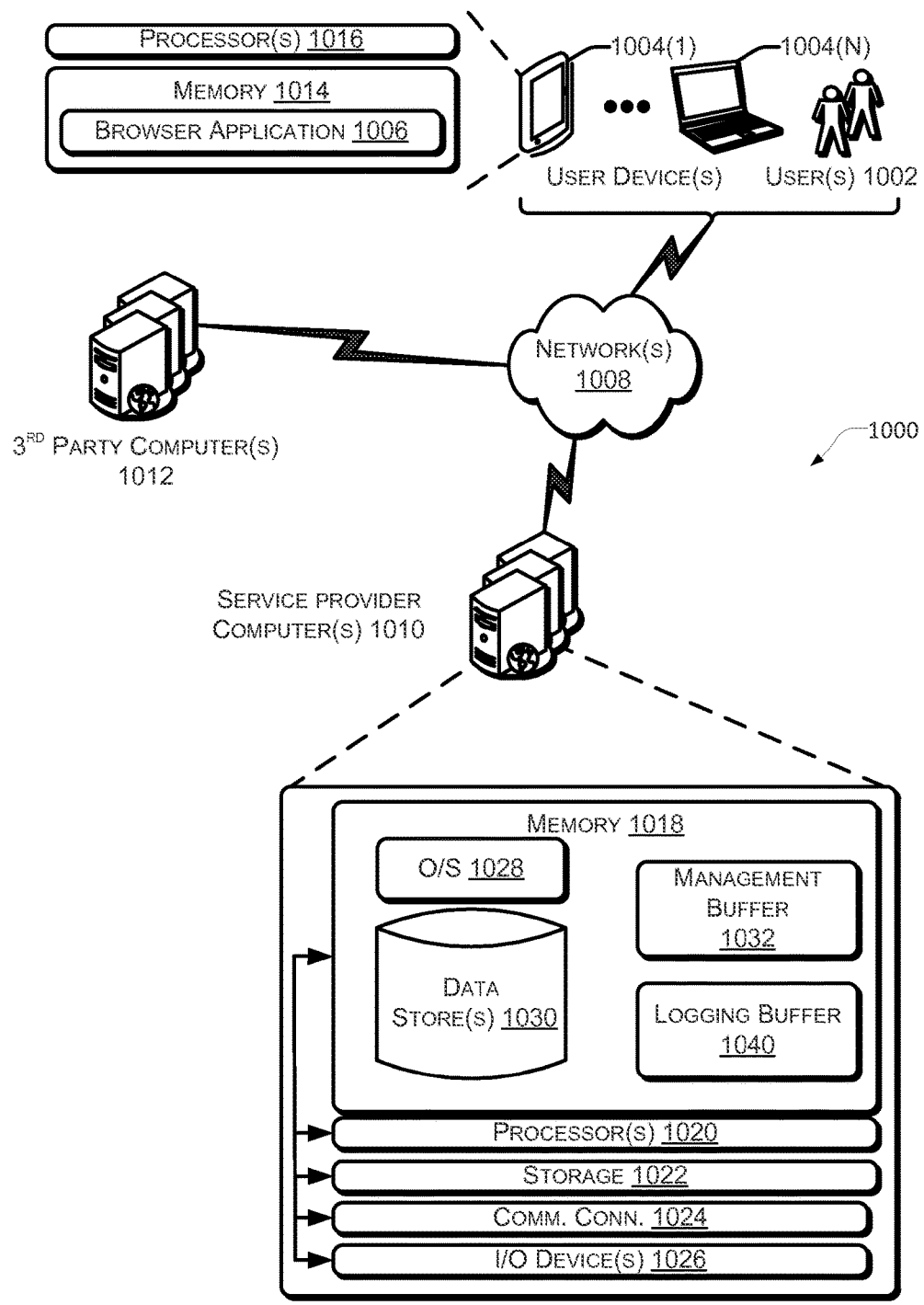
FIG. 10 illustrates an exemplary architecture for features and systems described herein that includes one or more service provider computers and/or a user device connected via one or more networks, according to at least one exemplary embodiment.

FIG. 10 illustrates an exemplary architecture for features and systems described herein that includes one or more service provider computers and/or a user device connected via one or more networks, according to at least one exemplary embodiment. The devices discussed in FIGS. 1-3, may use one or more components of the computing devices described in FIG. 10 or may represent one or more computing devices described in FIG. 10. In the illustrated architecture 1000, one or more users 1002 may use user computing devices 1004(1)-(N) to access a functional block 1006 (e.g., a web browser or mobile device application), via one or more networks 1008. In some aspects, the application 1006 may be hosted, managed and/or provided by a computing resources service or service provider. One or more service provider computers 1010 may provide a native application which is configured to run on the user devices 1004 which user(s) 1002 may interact with. The service provider computer(s) 1010 may, in some examples, provide computing resources such as, but not limited to, client entities, low latency data storage, durable data storage, data access, management, virtualization, cloud-based software solutions, electronic content performance management, etc. The service provider computer(s) 1010 may also be operable to provide web hosting, computer application development and/or implementation platforms, combinations of the foregoing or the like to the user(s) 1002. The service provider computer(s) 1010, in some examples, may communicate with one or more third party computers 1012.

In some examples, network(s) 1008 may include any one or a combination of many different types of networks, such as cable networks, the Internet, wireless networks, cellular networks and other private and/or public networks. While the illustrated example represents the user(s) 1002 accessing a functional block 1006 over the network(s) 1008, the described techniques may equally apply in instances where the user(s) 1002 interact with the service provider computer(s) 1010 via user device(s) 1004 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, the application 1006 may allow the user(s) 1002 to interact with the service provider computer(s) 1010 such as to access web content (e.g., web pages, music, video, etc.). The service provider computer(s) 1010, which may be arranged in a cluster of servers or as a server farm, may host the application 1006 and/or cloud-based software services. Other server architectures may also be used to host the application 1006. The application 1006 may be capable of handling requests from many users 1002 and serving, in response, various item web pages. The application 1006 can provide any type of website that supports user interaction, including social networking sites, online retailers, informational sites, blog sites, search engine sites, news and entertainment sites and so forth. As discussed above, the described techniques can similarly be implemented outside of the application 1006, such as with other applications running on the user device(s) 1004.

The user device(s) 1004 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user device(s) 1004 may be in communication with the service provider computer(s) 1010 via the network(s) 1008, or via other network connections. Additionally, the user device(s) 1004 may be part of the distributed system managed by, controlled by or otherwise part of the service provider computer(s) 1010 (e.g., a console device integrated with the service provider computers 1010).

In one illustrative configuration, a user device(s) 1004 may include at least one memory 1014 and one or more processing units (or processor(s) 1016). The processor(s) 1016 may be implemented as appropriate in hardware, computer-executable instructions, firmware, or combinations thereof. Computer-executable instruction or firmware implementations of the processor(s) 1016 may include computer-executable or machine-executable instructions written in any suitable programming language to perform the various functions described. The user device(s) 1004 may also include geo-location devices (e.g., a global positioning system (GPS) device or the like) for providing and/or recording geographic location information associated with the user device(s) 1004.

The memory 1014 may store program instructions that are loadable and executable on the processor(s) 1016, as well as data generated during the execution of these programs. Depending on the configuration and type of the user device(s) 1004, the memory 1014 may be volatile (such as random access memory (RAM)) and/or non-volatile (such as read-only memory (ROM), flash memory, etc.). The user device(s) 1004 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, the memory 1014 may include multiple different types of memory, such as static random access memory (SRAM), dynamic random access memory (DRAM), or ROM.

Turning to the contents of the memory 1014 in more detail, the memory 1014 may include an operating system and one or more application programs or services for implementing the features disclosed herein including at least a user provided input element or electronic service web page, such as via a browser application 1006 or dedicated applications (e.g., smart phone applications, tablet applications, etc.). The browser application 1006 may be configured to receive, store and/or display a website or other interface for interacting with the service provider computer(s) 1010. Additionally, the memory 1014 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 1004.

In some aspects, the service provider computer(s) 1010 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 1010 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the service provider computer(s) 1010 may be in communication with the user device(s) 1004 and/or other service providers via the network(s) 1008, or via other network connections. The service provider computer(s) 1010 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, the service provider computer(s) 1010 may include at least one memory 1018 and one or more processing units (or processor(s) 1020). The processor(s) 1020 may be implemented as appropriate in hardware, computer-executable instructions, firmware or combinations thereof. Computer-executable instruction or firmware implementations of the processor(s) 1020 may include computer-executable or machine-executable instructions written in any suitable programming language to perform the various functions described.

In some instances, the hardware processor(s) 1020 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

The memory 1018 may store program instructions that are loadable and executable on the processor(s) 1020, as well as data generated during the execution of these programs. Depending on the configuration and type of the service provider computer(s) 1010, the memory 1018 may be volatile (such as RAM) and/or non-volatile (such as ROM, flash memory, etc.). The service provider computer(s) 1010 or servers may also include additional storage 1022, which may include removable storage and/or non-removable storage. The additional storage 1022 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 1018 may include multiple different types of memory, such as SRAM, DRAM, or ROM.

The memory 1018, the additional storage 1022, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. The memory 1018 and the additional storage 1022 are all examples of computer storage media. Additional types of computer storage media that may be present in the service provider computer(s) 1010 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 1010. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

The service provider computer(s) 1010 may also contain communications connection(s) 1024 that allow the service provider computer(s) 1010 to communicate with a stored database, another computing device or server, user terminals and/or other devices on the network(s) 1008. The service provider computer(s) 1010 may also include I/O device(s) 1026, such as a keyboard, a mouse, a pen, a voice input device, a touch input device, a display, speakers, a printer and the like.

The memory 1018 may include an operating system 1028, one or more data stores 1030 and/or one or more application programs or services for implementing the features disclosed herein, including a management buffer 1032 and a logging buffer 1040. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 10, and/or functions described herein can be provided by one or more modules that exist as separate modules and/or module functions described herein can be spread over multiple modules.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An integrated circuit, comprising:
   a first component;
   a second component;
   an external memory interface;
   a first Direct Memory Access (DMA) functional block circuit coupled with the external memory interface and configured to:
      communicate with the first component using a first physical interface of a first design, and
      communicate with a common memory device external to the integrated circuit using a second physical interface of a second design and via the external memory interface;
   and
   a second DMA functional block circuit coupled with the external memory interface and configured to:
      communicate with the second component using a third physical interface of the first design, the third physical interface being separated from the first physical interface; and
      communicate with the common memory device using a fourth physical interface of the second design, the fourth physical interface being separated from the second physical interface,
   wherein the first component and the second component are configured to perform different functions.

2. The integrated circuit of claim 1, wherein one of the first component and the second component comprises an ethernet controller.

3. The integrated circuit of claim 1, wherein one of the first component and the second component comprises a cryptography engine.

4. The integrated circuit of claim 1, wherein the first physical interface is a streaming interface.

5. The integrated circuit of claim 1, wherein one of the first component and the second component includes a processing core configured to execute ARM® instructions.

6. The integrated circuit of claim 1, further comprising a bus controller coupled to each of the first DMA functional block circuit and the second DMA function block circuit using, respectively, the second physical interface and the fourth physical interface.

7. The integrated circuit of claim 6, wherein each of the second physical interface and the fourth physical interface is an Advanced Extensible Interface (AXI) interface.

8. An integrated circuit, comprising:
   a plurality of Direct Memory Access (DMA) engines, the plurality of DMA engines comprising a first DMA engine and a second DMA engine;
   a first functional block configured to perform a first function, the first functional block being associated with the first DMA engine; and
   a second functional block configured to perform a second function different from that of the first functional block, the second functional block being associated with the second DMA engine,
   wherein the first DMA engine of the plurality of DMA engines is coupled to the first functional block and the second DMA engine of the plurality of DMA engines is coupled to the second functional block,
   wherein the first DMA engine communicates with the first functional block using a first common interface,
   wherein the second DMA engine communicates with the second functional block using a second common interface, and
   wherein the first and second common interfaces have a same design.

9. The integrated circuit of claim 8, wherein the first functional block is configured to transport data to a memory device external to the integrated circuit using an interface.

10. The integrated circuit of claim 9, wherein the interface is an ethernet interface.

11. The integrated circuit of claim 8, wherein the first DMA engine is configured to configure itself based on a first work descriptor, and wherein the second DMA engine is configured to configure itself based on a second work descriptor.

12. The integrated circuit of claim 8, wherein the first DMA engine comprises a parser configured to parse a received work descriptor to obtain configuration data for configuration of the first DMA engine.

13. The integrated circuit of claim 12, wherein the first DMA engine further comprises a configuration component configured to modify a functionality of subcomponents of the first DMA engine based on the configuration data.

14. The integrated circuit of claim 8, wherein each of the plurality of DMA engines has substantially similar physical characteristics.

15. The integrated circuit of claim 8, wherein each of the plurality of DMA engines has the same physical characteristics.

16. A method of transferring data using a Direct Memory Access (DMA) circuit component, comprising:
storing, by the DMA circuit component, data from a first memory location;
storing, by the DMA circuit component, a work descriptor including configuration information related to a data format for a target circuit block, the target circuit block being different from the DMA circuit component;
parsing the work descriptor, by the DMA circuit component, to determine the configuration information;
configuring, based on the configuration information, the DMA circuit component to transmit the data to the target circuit block in the data format.

17. The method of claim 16, wherein the transmitted data is concatenated based on the configuration information.

18. The method of claim 16, wherein the work descriptor includes a buffer pointer to a memory address of data to be transported.

19. The method of claim 16, further comprising:
obtaining a first data set and a second data set from respective memory locations; and
formatting the first data set and the second data set to generate the transmitted data based on the configuration information.

20. The method of claim 16, wherein the work descriptor includes a metadata field that is configurable to provide data associated with a function of a second functional block, wherein the method further comprises:
performing the function associated with the second functional block based on the metadata field of the work descriptor.

21. The method of claim 16, further comprising:
obtaining, based on the configuration information, a cryptographic cypher from a second memory location and a data set from a third memory location; and
transporting the cryptographic cypher and the data set to a fourth memory location.

22. The method of claim 16, wherein the work descriptor is received via a first interface that couples the DMA circuit component to a plurality of circuit components each being associated with a different function.

23. The method of claim 16, wherein the work descriptor indicates a priority level associated with the data;
wherein the method further comprises: scheduling the transmission of the data to the target circuit block based on the priority level.

24. The integrated circuit of claim 1, further comprising an interconnect coupled with the second physical interface of the first DMA function block circuit, the fourth physical interface of the second DMA functional block, and the external memory interface.

* * * * *